Oct. 14, 1952  W. J. LENZ  2,614,043
PROCESS OF ROASTING COFFEE
Filed April 28, 1950
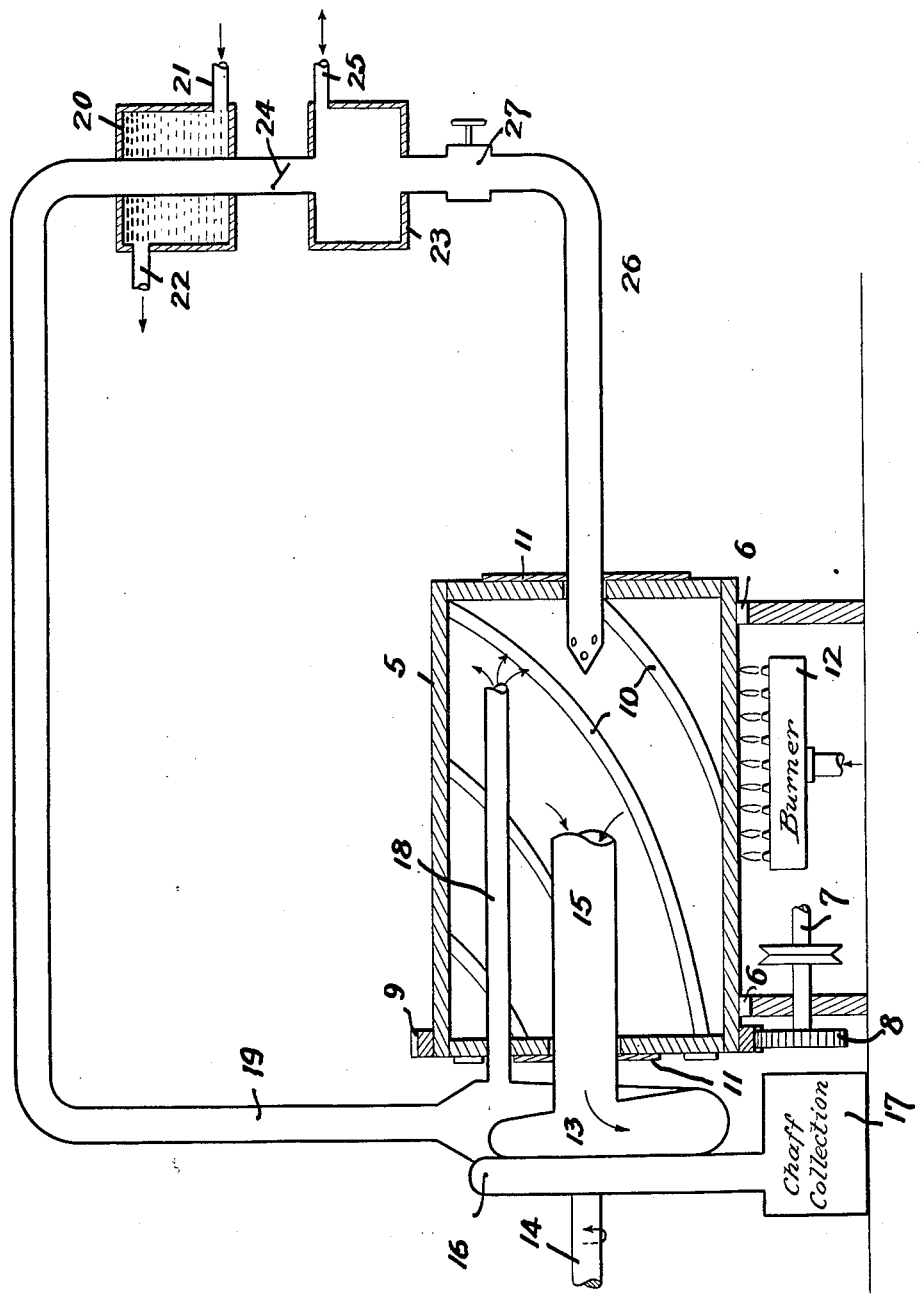
INVENTOR.
William J. Lenz
BY
atty.

Patented Oct. 14, 1952

2,614,043

UNITED STATES PATENT OFFICE 2,614,043

PROCESS OF ROASTING COFFEE

William J. Lenz, Louisville, Ky.; Herman Cohen administrator of said William J. Lenz, deceased Application April 28, 1950, Serial No. 158,700

9 Claims. (Cl. 99—68)

This invention is an improved method of roasting coffee, the primary object of which is to produce roasted coffee superior in quality to that heretofore obtained by other methods, and by which the taste and aroma of the finished product is materially improved, this invention being a continuation in part of my former application Serial No. 139,995, now abandoned.

A further object is to provide a process by means of which a substantial reduction in shrinkage loss during the roasting process is obtained, while at the same time the taste and aroma of the finished product is materially improved.

A still further object is to provide a coffee roasting process by means of which I am able to develop from inferior grades of coffee beans a finished product having a quality superior to other coffees, even those produced from selected and more expensive grades of coffee beans.

A further object is to include in the improved process means by which chaff and other undesirable materials may be removed during the roasting process, thus assuring a high quality finished product.

The invention further contemplates a process quite simple in its operation and requiring apparatus of simple construction for carrying out the several steps of the process.

The improved process is carried out by means of the apparatus shown in the drawing forming a part hereof, and wherein the single view shows the apparatus partly in section and partly in elevation.

The improved process consists essentially in roasting the coffee in a heated sealed drum or chamber, drawing from the drum such vapors as are produced during the roasting process, condensing the vapors, removing such vapors as are not condensible, and, when the roast of the beans is completed, quenching the beans with the liquid condensate, all in a continuous closed cycle. Additionally, the process includes withdrawing from the vapors arising in the roasting chamber foreign matter such as chaff, bean hulls, or other undesirable debris, after which the cleansed vapors eventually find their way through the closed system to the condensation chamber.

The process also includes the step, should it be found desirable, of reintroducing the liquid condensate, or a part thereof, to the coffee beans during the roasting cycle, thus bringing about a basting operation during the roasting period and prior to the quench.

Referring now more particularly to the drawing, 5 represents a conventional roasting chamber, here illustrated in the form of a horizontally disposed rotatable drum mounted upon suitable bearings 6 and rotated from a power shaft 7 through a gear 8 in mesh with a ring gear 9 affixed to the periphery of the drum. It will be understood that the drum here shown is for purposes of illustration only as other types of coffee roasting chambers may be employed. In this instance, the drum is provided upon its interior periphery with arcuate inwardly projecting fins 10 constituting agitator blades, and the drum will also be tightly sealed at its ends by the heads 11. Heat for the drum may be provided by any suitable means, a conventional burner 12 being shown in the present instance.

Associated with the drum is a circulator indicated at 13, the said circulator being of the rotary or centrifugal type and is driven by a power shaft 14. The intake for the circulator comprises the tube or pipe 15 entering one end of the drum and here shown as disposed in the longitudinal center of the latter, the inner end of the tube being open. The circulator will be provided with a separator indicated at 16 and a chaff and debris collection chamber 17 is associated therewith. A vapor pipe 18 connecting with the discharge side of the circulator extends back into the drum and has its open end communicating with the interior thereof.

A volatile oil vapor line 19 leads from the discharge side of the circulator, and associated therewith is a condenser unit 20, the latter having water intake and discharge lines connected therewith as indicated at 21 and 22 respectively. From the condenser unit 20 the line 19 communicates with a volatile oil collector chamber 23, a check valve 24 being arranged in the line 19 adjacent the supply side of said chamber. The upper end of this chamber is provided with a pipe 25 to bring about vacuum or pressure, as desired, within the chamber 23.

A return pipe 26 communicates with the lower end of the chamber 23 and is provided with a valve 27, the opposite end of the pipe leading back into the roasting drum 5 as shown.

In operation, the green coffee beans are supplied to the roasting chamber 5 in the proper quantity, whereupon the chamber is heated to the proper or predetermined degree by means of the burner 12. During the roasting process the drum 5 rotates continuously, whereupon the beans are constantly tumbled and agitated so as to insure an even temperature throughout the entire mass. During this process, the vapors produced in the drum will be drawn out through the tube 15 and through the circulator 13, whereupon bean hulls, chaff or other foreign matter is separated from the volatile vapors, the chaff and other foreign matter being collected in container 7 and the vapors in part thus cleansed of such material is returned to the interior of the heated drum. In this manner the hot vapors are kept in circulation during the roasting and an even distribution of heat to all parts of the roast is assured, whereby roasting time is economized as is fuel consumption. The cleansed volatile vapors pass through the line 19 and are condensed in the condensing chamber 20, after which they pass into the liquid condensate tank 23. During this operation partial vacuum or negative pressure may be applied to line 25, whereby such vapors as are not condensible are removed from the closed system. Additionally, this negative pressure creates a drag in line 19 to withdraw and collect all vapors generated or created in the closed drum 5, including valuable volatile oils heretofore referred to, which find their way in condensed form into the chamber 23. The condensate collected in the tank 23 constitutes those valuable liquids or substances which emanate from the coffee beans during the roasting process.

When the roast is completed, the burner 12 is extinguished, after which the valve 27 is opened and the liquid condensate in tank 23 passes back into the roasting chamber and is reintroduced to the beans as a quench while rotation of the drum continues. This flow of liquid condensate back into the roasting chamber may be augmented, if desired, by introducing pressure in the line 25. The roasting, separation of chaff, reintroduction of a part of the cleansed vapors to the roasting chamber, the passage of the valuable volatile vapors through the condensing chamber, into the liquid condensate tank and back into the roasting drum all occurs in a closed cycle. It will be understood that the quenching operation continues while the beans remain hot until at last the desired quantity of trapped valuable volatile substances in chamber 23 will have been reabsorbed and retained by the coffee beans in the roasting drum 5. It will be found that by treating the coffee in the manner here described, the valuable elements of the vapors given off from the coffee beans during the roasting process will have been rid of chaff or other objectionable matter or debris before being reintroduced to the roasting drum as a quench. The utilization of the condensed vapors for quenching purposes obviates the necessity of introducing extraneous water, not derived from the coffee beans themselves, or other liquid for this purpose as has been heretofore the custom.

The coffee treatment here proposed also contemplates the introduction into a closed cycle of superior liquid condensate or substance to coffee beans of a different grade from which said condensate or substances may have been extracted. For instance, it may be found highly desirable to introduce to the closed roasting cycle of coffee beans of an inferior grade, liquid condensate or substances which have been theretofore abstracted from coffee beans of a superior grade, whereby to produce in the inferior grade beans flavor and aroma of the superior bean condensate or substances.

In introducing to the roasting chamber the cleansed and heated vapors brings about a turbulence within the chamber, effecting heat transfer efficiency, producing even temperature in the entire roasting chamber, and enveloping the beans with a uniform degree of heat. In addition to these advantages, the roasting time is reduced with a corresponding economy in fuel consumption.

In instances where it may be found desirable to baste the coffee beans during the roasting period, the valve 27 will be so adjusted that the liquid condensate, or a part thereof, collected in chamber 23, will flow into the drum and thus be again introduced to the coffee beans during the roast. It will be understood that the vapors arising from the liquid condensate thus reintroduced will again pass through the pipe 19 and eventually accumulate as condensate in chamber 23. During this basting operation it may be found desirable to introduce atmospheric air through pipe 25 to help polymerization of certain of the aromatic oils, as well as to dissipate so-called "smoke" or non-condensible gases in the system.

Thus, during the entire roasting process, the condensed vapors are continuously returned to the roasting chamber. At such time as the roast begins to reach critical temperatures, the valve 27 will be closed, whereupon all condensation of vapors will remain in collection chamber 23. When the time arrives for quenching, the valve 27 will be opened, whereupon the condensate flows through the pipe 26 and into the roasting chamber.

It will be found that by treating the coffee by this step of the process, the valuable elements of the vapors given off from the coffee beans during the roasting process will be continuously returned in the form of liquid condensate to the roasting chamber and to the coffee undergoing the roasting process. By utilizing the condensed vapors for quenching purposes, the use of water or other liquid for this purpose is dispensed with, as the quenching here proposed returns to the coffee the valuable condensation of vapors given off from the coffee beans.

This application discloses and claims the subject matter of my prior applications, Serial No. 762,579, filed July 22, 1947, and Serial No. 139,995, filed January 23, 1950.

I claim:

1. The method of treating coffee, comprising roasting the coffee beans in a closed chamber, withdrawing the vapors from said chamber, condensing the condensible constituents of said vapors to form a condensate, removing the non-condensible vapors, and reintroducing said condensate to said closed chamber, all in a closed system.

2. The method of roasting coffee, comprising roasting the coffee in a closed system while agitating said coffee, drawing off the volatile components during the roasting, condensing the condensible constituents of the coffee vapors to form a liquid condensate, and gradually reintroducing the liquid condensate to said system during the roasting of the coffee so that the coffee beans in a heated state will gradually absorb said liquid condensate.

3. An improvement in the process of roasting coffee beans and then immediately quenching them with liquid, comprising: conducting the consecutive roasting and liquid quenching operations in a closed system which confines both the roasting and the quenching vapors emanating from the coffee; and contemporaneously, during the roasting and quenching operations, agitating the coffee beans and condensing the condensible constituents of the confined vapors to form a condensate derived from coffee.

4. The process of claim 3 including the step of contemporaneously removing the non-condensibles from the system during the condensing operation.

5. The process of claim 3 including the step of feeding a condensate, derived from coffee, directly to the beans in said closed system during the quenching operation.

6. The process of claim 3 including the step of feeding said condensate directly to the beans in said closed system during the quenching period for quenching operation.

7. A method of treating coffee at the end of the roasting operation comprising: quenching the hot roasted coffee beans with liquid in a closed chamber; withdrawing the vapors from said chamber; condensing the condensible constituent of said vapors to form a condensate derived from coffee; removing the non-condensible vapors; and introducing a condensate derived from coffee to said closed chamber.

8. An improvement in the process of roasting coffee beans and then immediately quenching them with liquid, comprising: conducting the liquid quenching operation in a closed system which confines the vapors emanating from the coffee; and contemporaneously, during the quenching operation, agitating the coffee beans and condensing the condensible constituents of the confined vapors to form a condensate derived from coffee.

9. The process of claim 8 including the step of feeding a condensate, derived from coffee, directly to the beans in said closed system during the quenching operation.

WILLIAM J. LENZ.

REFERENCES CITED

The following references are of record in the file of this patent:

UNITED STATES PATENTS

| Number | Name | Date |
| --- | --- | --- |
| 726,279 | Giacomini | Apr. 28, 1903 |
| 754,943 | Trinby | Mar. 15, 1904 |
| 1,426,011 | Reynolds | Aug. 15, 1922 |
| 2,087,602 | McCrosson | July 20, 1937 |
| 2,168,797 | Havis | Aug. 8, 1939 |